US010777891B2

(12) United States Patent
Wang et al.

(10) Patent No.: US 10,777,891 B2
(45) Date of Patent: Sep. 15, 2020

(54) SCALABLE RADIO FREQUENCY ANTENNA ARRAY STRUCTURES

(71) Applicant: SWIFTLINK TECHNOLOGIES INC., Richmond OT (CA)

(72) Inventors: Hua Wang, Atlanta, GA (US); Thomas Chen, Atlanta, GA (US); Taiyun Chi, Atlanta, GA (US)

(73) Assignees: SWIFTLINK TECHNOLOGIES INC., Richmond (CA); GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 15/874,850

(22) Filed: Jan. 18, 2018

(65) Prior Publication Data

US 2019/0221934 A1    Jul. 18, 2019

(51) Int. Cl.
*H01Q 5/42* (2015.01)
*H01Q 21/30* (2006.01)
*H01Q 21/00* (2006.01)
*H04B 1/00* (2006.01)

(52) U.S. Cl.
CPC ........... *H01Q 5/42* (2015.01); *H01Q 21/0025* (2013.01); *H01Q 21/30* (2013.01); *H04B 1/006* (2013.01); *H04B 1/0064* (2013.01)

(58) Field of Classification Search
CPC ..... H01Q 21/065; H01Q 21/30; H04B 1/0064
See application file for complete search history.

(56) References Cited

U.S. PATENT DOCUMENTS

| | | | |
|---|---|---|---|
| 2003/0137456 A1* | 7/2003 | Sreenivas | H01Q 1/38 343/700 MS |
| 2015/0042513 A1* | 2/2015 | Foo | H01Q 1/246 342/368 |
| 2015/0214617 A1* | 7/2015 | Shang | H01Q 1/246 343/722 |
| 2019/0081414 A1* | 3/2019 | Kao | H01Q 21/30 |
| 2019/0089057 A1* | 3/2019 | Mitchell | H01Q 5/35 |

* cited by examiner

*Primary Examiner* — Daniel Munoz
(74) *Attorney, Agent, or Firm* — Womble Bond Dickinson (US) LLP

(57) ABSTRACT

According to one embodiment, an antenna includes multiple high-band (HB) radiation elements and a low-band (LB) radiation element. Each HB radiation element is configured to resonate or excite within a first frequency band to transmit and/or receive RF signals associated with the first frequency band. The LB band radiation element is configured to resonate or excite within a second frequency band to transmit and/or receive RF signals associated with the second frequency band. The HB radiation elements are arranged such that the distance between any two of the HB radiation elements is at least a half of a wavelength associated with the first frequency band. The LB radiation element is surrounded by the HB radiation element, for example, in a symmetrical manner.

20 Claims, 8 Drawing Sheets

500

SCALABLE RADIO FREQUENCY ANTENNA ARRAY STRUCTURES

FIELD OF THE INVENTION

Embodiments of the present invention relate generally to radio frequency (RF) antennas. More particularly, embodiments of the invention relate to multi-band RF antennas.

BACKGROUND

As wireless communications technologies evolve, multi-mode or multi-band wireless systems are routinely available. Such systems may partition different functions into different integrated circuit (IC) devices. For example, a wireless system may include a baseband processor, a transceiver, control circuitry, receive circuitry, transmit circuitry, or the like. Such multiple IC devices are sometimes inconvenient and cost ineffective.

In addition, conventional antennas cannot efficiently satisfy the requirements of multi-band communications. Such antennas are not scalable and cannot meet various configurations of communication devices or systems.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
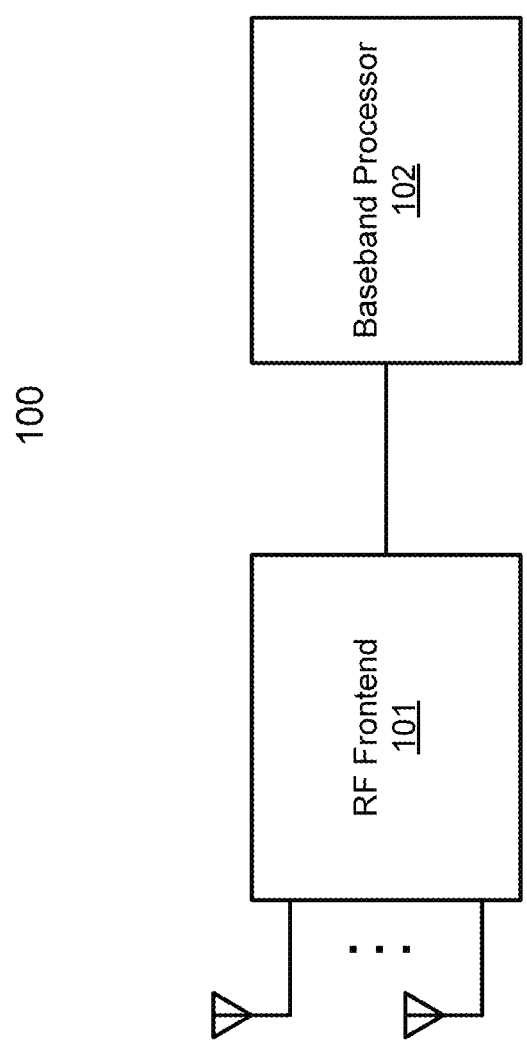
FIG. 1 is a block diagram illustrating an example of a wireless communication device according one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, an antenna includes multiple high-band (HB) radiation elements and a low-band (LB) radiation element. Each HB radiation element is configured to resonate or excite within a first frequency band to transmit and/or receive RF signals associated with the first frequency band. The LB band radiation element is configured to resonate or excite within a second frequency band to transmit and/or receive RF signals associated with the second frequency band. The HB radiation elements are arranged such that the distance between any two of the HB radiation elements is at least a half of a wavelength associated with the first frequency band. The LB radiation element is surrounded by the HB radiation elements, for example, in a symmetrical manner.

In one embodiment, the first frequency band is ranging approximately from 59 Gigahertz (GHz) to 71 GHz, while the second frequency band is ranging approximately from 24 GHz to 43 GHz. The distance between any two nearest or adjacent HB radiation elements is ranging approximately from 2.07 millimeters (mm) to 2.50 mm, preferably 2.3 mm. In a particular embodiment, an antenna includes at least four HB radiation elements that symmetrically surround an LB radiation element. In one embodiment, each of the HB radiation elements and the LB radiation element is in a substantially rectangular or square shape.

According to another aspect of the invention, an antenna array includes a number of antenna units. Each antenna unit includes multiple HB radiation elements and an LB radiation element. Each HB radiation element is configured to resonate or excite within a first frequency band to transmit and/or receive RF signals associated with the first frequency band. The LB band radiation element is configured to resonate or excite within a second frequency band to transmit and/or receive RF signals associated with the second frequency band. The HB radiation elements are arranged such that the distance between any two of the HB radiation elements is at least a half of a wavelength associated with the first frequency band. The LB radiation element is surrounded by the HB radiation elements, for example, in a symmetrical manner.

In one embodiment, a distance between an LB radiation element of any one of the antenna units and an LB radiation element of another one of the antenna unit is at least a half of a wavelength associated with the second frequency band, such as, for example, 4.5 mm. In a particular embodiment, the distance between an LB radiation element of any one of the antenna units and a nearest or adjacent LB radiation element of another one of the antenna unit is approximately ranging from 4.05 mm to 4.95 mm. The number of antenna units can be scaled up or down dependent upon the configuration. When the number of antenna units increases, the distance between any two of the HB radiation elements and the distance between any two of the LB radiation elements of any antenna unit or antenna units have to satisfy the distance requirements set forth above.

FIG. 1 is a block diagram illustrating an example of a wireless communication device according one embodiment of the invention. Referring to FIG. 1, wireless communication device 100 (also simply referred to as a wireless device) includes, amongst others, an RF frontend module 101 and a baseband processor 102. Wireless device 100 can be any kind of wireless communication devices such as, for example, mobile phones, laptops, tablets, network appliance devices (e.g., Internet of thing or IOT appliance devices), etc.

In a radio receiver circuit, the RF frontend is a generic term for all the circuitry between the antenna up to and including the mixer stage. It consists of all the components in the receiver that process the signal at the original incoming radio frequency, before it is converted to a lower intermediate frequency (IF). In microwave and satellite receivers it is often called the low-noise block (LNB) or low-noise downconverter (LND) and is often located at the antenna, so that the signal from the antenna can be transferred to the rest of the receiver at the more easily handled intermediate frequency. A baseband processor is a device (a chip or part of a chip) in a network interface that manages all the radio functions (all functions that require an antenna).

In one embodiment, RF frontend module 101 includes an array of RF transceivers, where each of the RF transceivers transmits and receives RF signals within a particular frequency band (e.g., a particular range of frequencies such as non-overlapped frequency ranges) via one of a number of RF antennas. The RF frontend IC chip further includes a full-band frequency synthesizer coupled to the RF transceivers. The full-based frequency synthesizer generates and provides a local oscillator (LO) signal to each of the RF transceivers to enable the RF transceiver to mix, modulate, and/or demodulate RF signals within a corresponding frequency band. The array of RF transceivers and the full-band frequency synthesizer may be integrated within a single IC chip as a single RF frontend IC chip or package.

Figure 2:
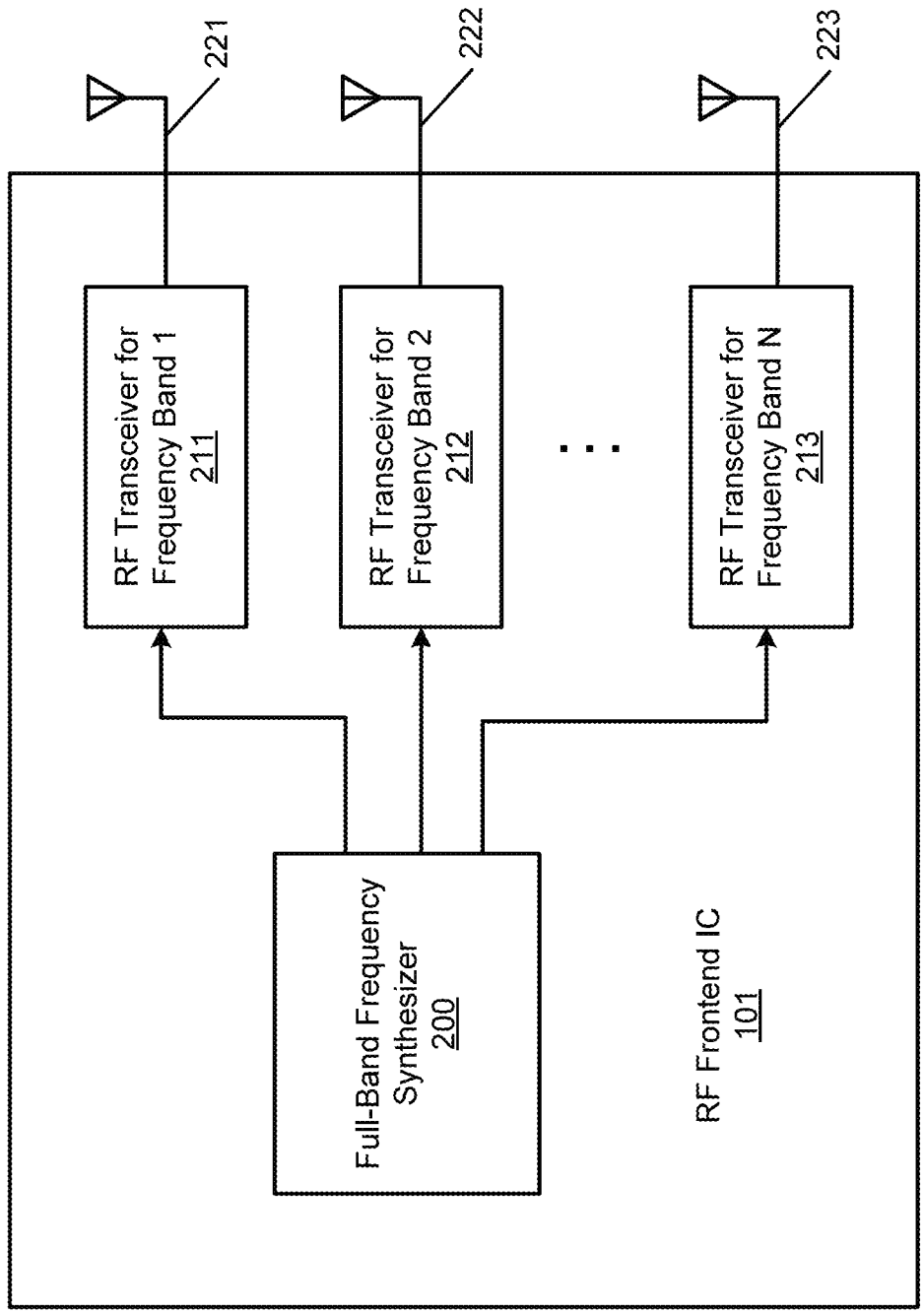
FIG. 2 is a block diagram illustrating an example of an RF frontend integrated circuit according to one embodiment of the invention.

FIG. 2 is a block diagram illustrating an example of an RF frontend integrated circuit according to one embodiment of the invention. Referring to FIG. 2, RF frontend 101 includes, amongst others, a full-base frequency synthesizer 200 coupled to an array of RF transceivers 211-213. Each of transceivers 211-213 is configured to transmit and receive RF signals within a particular frequency band or a particular range of RF frequencies via one of RF antennas 221-223. In one embodiment, each of transceivers 211-213 is configured to receive a LO signal from full-band frequency synthesizer 200. The LO signal is generated for the corresponding frequency band. The LO signal is utilized to mix, modulate, demodulated by the transceiver for the purpose of transmitting and receiving RF signals within the corresponding frequency band.

Figure 3:
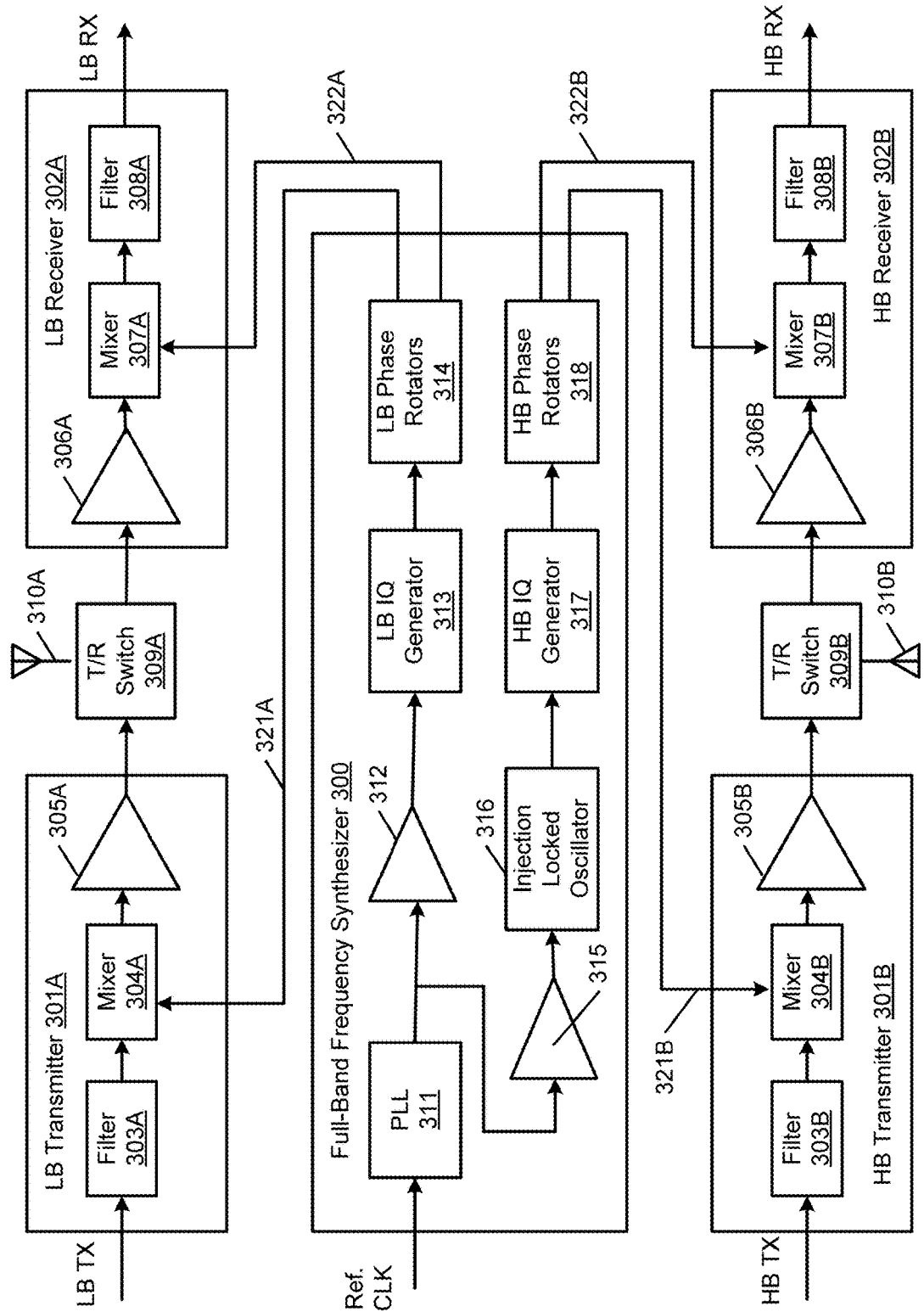
FIG. 3 is a block diagram illustrating an RF frontend integrated circuit according to another embodiment of the invention.

FIG. 3 is a block diagram illustrating an RF frontend integrated circuit according to another embodiment of the invention. Referring to FIG. 3, full-band frequency synthesizer 300 may represent full-band frequency synthesizer 101 as described above. In one embodiment, full-band frequency synthesizer 300 is communicatively coupled to an array of transceivers, each transceiver corresponding to one of a number of frequency bands. In this example, full-band frequency synthesizer 300 is coupled to transmitter 301A, receiver 302A, transmitter 301B, and receiver 302B. Transmitter 301A and receiver 302A may be a part of a first transceiver operating in a lower frequency band, referred to as a low-band (LB) transmitter and LB receiver. Transmitter 301B and receiver 302B may be a part of a second transceiver operating in a higher frequency band, referred to as a high-band (HB) transmitter and HB receiver. Note that although there are only two transceivers as shown in FIG. 3, more transceivers may also be coupled to full-band frequency synthesizer 300 as shown in FIG. 2.

In one embodiment, frequency synthesizer 300 includes, but is not limited to, phase-lock loop (PLL) circuitry or block 311, a LO buffer 312, LB in-phase/quadrature (IQ) generator 313, and LB phase rotators 314. A PLL is a control system that generates an output signal whose phase is related to the phase of an input signal. While there are several differing types, it is easy to initially visualize as an electronic circuit consisting of a variable frequency oscillator and a phase detector. The oscillator generates a periodic signal, and the phase detector compares the phase of that signal with the phase of the input periodic signal, adjusting the oscillator to keep the phases matched. Bringing the output signal back toward the input signal for comparison is called a feedback loop since the output is "fed back" toward the input forming a loop.

Keeping the input and output phase in lock step also implies keeping the input and output frequencies the same. Consequently, in addition to synchronizing signals, a phase-locked loop can track an input frequency, or it can generate a frequency that is a multiple of the input frequency. These properties are used for computer clock synchronization, demodulation, and frequency synthesis. Phase-locked loops are widely employed in radio, telecommunications, computers and other electronic applications. They can be used to demodulate a signal, recover a signal from a noisy communication channel, generate a stable frequency at multiples of an input frequency (frequency synthesis), or distribute precisely timed clock pulses in digital logic circuits such as microprocessors.

Referring back to FIG. 3, PLL block 311 is to receive a clock reference signal and to lock onto the frequency of the clock reference signal to generate a first LO signal, i.e., a low-band LO signal or LBLO signal. The first LO signal may be optionally buffered by a LO buffer 312. Based on the LBLO signal, LB IQ generator 313 generates IQ signals that are suitable for mixing, modulating, and demodulating in-phase and quadrature components of RF signals. The IQ signals may be rotated by a predetermined angle or delayed by LB phase rotators 314. The rotated IQ signals are then provided to LB transmitter 301A and receiver 302A. Particularly, the IQ signals may include transmitting IQ (TXIQ) signals 321A to be provided to LB transmitter 301A and in-phase and quadrature receiving IQ (RXIQ) signals 322A to be provided to LB receiver 302A.

In one embodiment, frequency synthesizer 300 further includes a frequency converter 315, injection locked oscillator 316, HB IQ generator 317, and HB phase rotators 318. Frequency converter 315 is to convert the first LO signal generated from the PLL block 311 to a signal with higher frequency (e.g., within a higher frequency band). In one embodiment, frequency converter 315 includes a frequency doubler to double the frequency of the first LO signal. Injection locked oscillator 316 is to lock onto the doubled-frequency signal received from frequency converter 315 to generator the second LO signal having the second LO frequency approximately twice as the first LO frequency. Note that in this example, the second LO frequency is twice as the first LO frequency. However, frequency converter 315 can convert and generate a frequency in any frequency range. If there are more frequency bands to be integrated within the RF frontend device, more frequency converters may be utilized to convert a reference frequency to a number of other lower or higher frequencies.

Injection locking and injection pulling are the frequency effects that can occur when a harmonic oscillator is disturbed by a second oscillator operating at a nearby frequency. When the coupling is strong enough and the frequencies near enough, the second oscillator can capture the first oscillator, causing it to have essentially identical frequency as the second. This is injection locking. When the second oscillator merely disturbs the first but does not capture it, the effect is called injection pulling. Injection locking and pulling effects are observed in numerous types of physical systems, however the terms are most often associated with electronic oscillators or laser resonators.

Referring back to FIG. 3, HB IQ generator 317 generates IQ signals that are suitable for mixing, modulating, and demodulating in-phase and quadrature components of RF signals in a high band frequency range. In electrical engineering, a sinusoid with angle modulation can be decomposed into, or synthesized from, two amplitude-modulated sinusoids that are offset in phase by one-quarter cycle ($\pi/2$ radians). All three functions have the same frequency. The amplitude modulated sinusoids are known as in-phase and quadrature components. Some people find it more convenient to refer to only the amplitude modulation (baseband) itself by those terms.

The IQ signals may be rotated by a predetermined angle or delayed by HB phase rotators 318. The rotated IQ signals are then provided to HB transmitter 301B and receiver 302B. Particularly, the IQ signals may include transmitting IQ (TXIQ) signals 321B to be provided to HB transmitter 301B and in-phase and quadrature receiving IQ (RXIQ) signals 322B to be provided to HB receiver 302B. Thus, components 312-314 are configured to generate TXIQ and RXIQ signals for LB transmitter 301A and LB receiver 302A, while components 315-318 are configured to generate TXIQ and RXIQ signals for HB transmitter 301B and HB receiver 302B. If there are more transmitters and receivers of more frequency bands involved, more sets of components 312-314 and/or components 315-318 may be maintained by frequency synthesizer 300 for generating the necessary TXIQ and RXIQ signals for the additional frequency bands.

In one embodiment, LB transmitter 301A includes a filter 303A, a mixer 304A, and an amplifier 305A. Filter 303A may be a low-pass (LP) filter that receives LB transmitting (LBTX) signals to be transmitted to a destination, where the LBTX signals may be provided from a baseband processor such as baseband processor 102. Mixer 301A (also referred to as an up-convert mixer or an LB up-convert mixer)) is configured to mix and modulate the LBTX signals onto a carrier frequency signal based on TXIQ signal provided by LB phase rotators 314. The modulated signals (e.g., low-band RF or LBRF signals) are then amplified by amplifier 305A and the amplified signals are then transmitted to a remote receiver via antenna 310A.

In one embodiment, LB receiver 302A includes an amplifier 306A, mixer 307A, and filter 308A. Amplifier 306A is to receive LBRF signals from a remote transmitter via antenna 310A and to amplify the received RF signals. The amplified RF signals are then demodulated by mixer 307A (also referred to as a down-convert mixer or an LB down-convert mixer) based on RXIQ signal received from LB phase rotators 314. The demodulated signals are then processed by filter 308A, which may be a low-pass filter. In one embodiment, LB transmitter 301A and LB receiver 302A share antenna 310A via a transmitting and receiving (T/R) switch 309A. T/R switch 309A is configured to switch between LB transmitter 301A and receiver 302A to couple antenna 310A to either LB transmitter 301A or LB receiver 302A at a particular point in time.

Similarly, HB transmitter 301B includes filter 303B, mixer 304B (also referred to as a HB up-convert mixer), and amplifier 305B having functionalities similar to filter 303A, mixer 304A, and amplifier 305A of LB transmitter 301A, respectively, for processing high-band transmitting (HBTX) signals. HB receiver 302B includes filter 306B, mixer 307B (also referred to as a HB down-convert mixer), and filter 308B having functionalities similar to amplifier 306A, mixer 307A, and filter 308A of LB receiver 302A, respectively, for processing high-band receiving (HBRX) signals. HB transmitter 301B and HB receiver 302B are coupled to antenna 310B via T/R switch 309B similar to the configuration of LB transmitter 301A and receiver 302A. Antenna 310A-310B may represent any one or more of antennas 221-223 of FIG. 2, which are not part of the RF frontend circuit.

Figure 4:
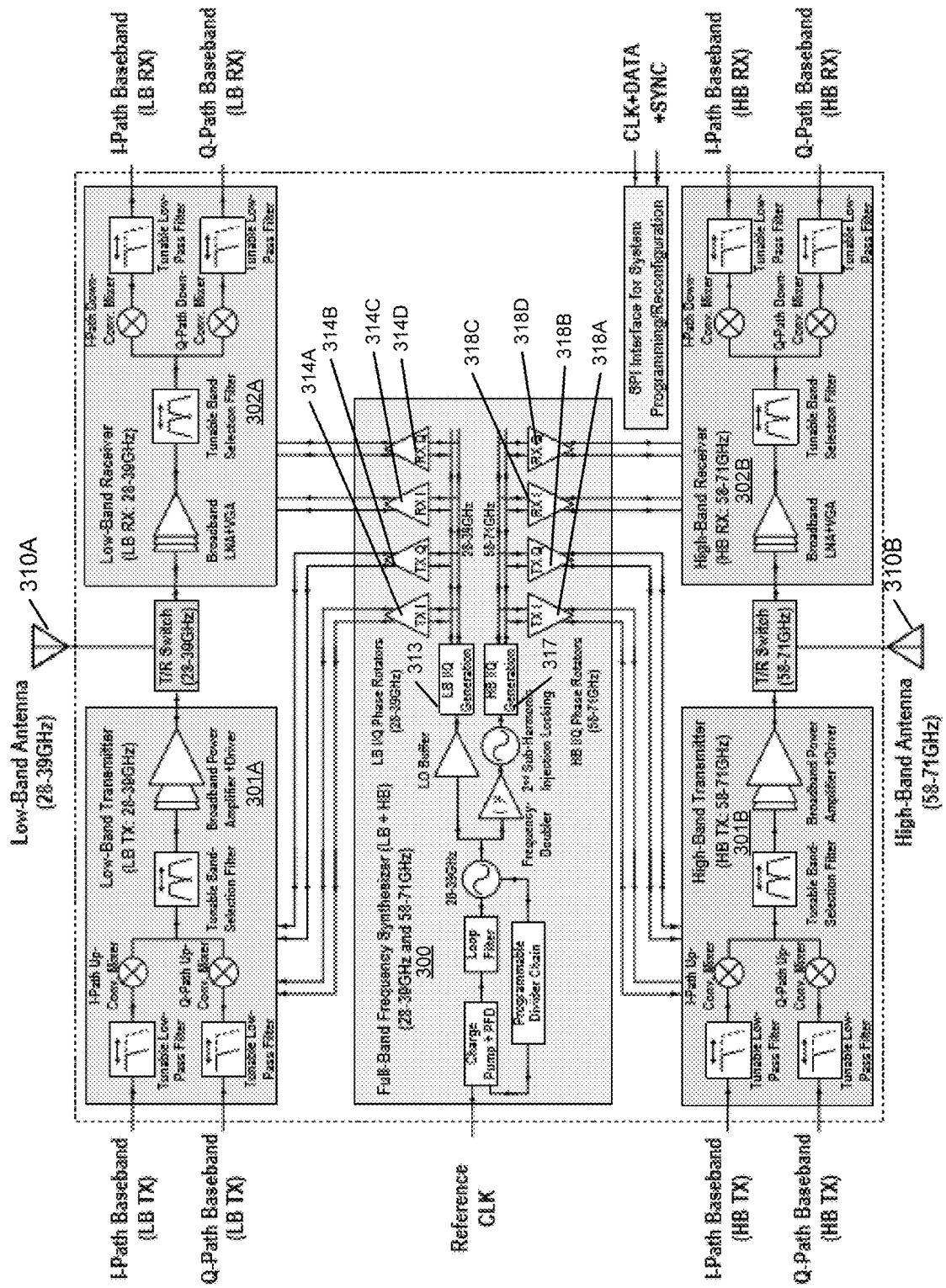
FIG. 4 is a block diagram illustrating an RF frontend integrated circuit according to another embodiment of the invention.

FIG. 4 is a block diagram illustrating an example of an RF frontend integrated circuit according to another embodiment of the invention. Referring to FIG. 4, in this embodiment, each of LB transmitter 301A, LB receiver 302A, HB transmitter 301B, and HB receiver 302B includes two paths: 1) I path for processing in-phase component signals and 2) Q-path for processing quadrature component signals. In one embodiment, LB transmitter 301A includes an I-path low-pass filter (e.g., a tunable low-pass filter) to receive I-path baseband signals and an I-path up-convert mixer to mix and modulate the I-path baseband signals. LB transmitter 301A includes a Q-path low pass filter (e.g., a tunable ow-pass filter) to receive Q-path baseband signals and a Q-path up-convert mixer to mix and modulate the Q-path baseband signals. LB transmitter 301A further includes a tunable band selection filter and an amplifier. The band selection filter (e.g., a band-pass filter) is to select the corresponding frequency band to remove noises that are outside of the corresponding band. The amplifier is to amplify the modulated RF signals to be transmitted to a remote device via antenna 310A. HB transmitter 301B includes similar components as of LB transmitter 301A for processing signals in a higher frequency band.

Similarly, according to one embodiment, LB receiver 302A includes an amplifier (e.g., a low-noise amplifier or LNA) to receive LBRF signals from a remote device via antenna 310A and a band selection filter (e.g., a band-pass filter). LB receiver 302A further includes an I-path down-convert mixer and a Q-path down-convert mixer to mix and demodulate the RF signal into I-path baseband signals and Q-path baseband signals. LB receiver 302A further includes an I-path low-pass filter and a Q-path low-pass filter to processing the I-path baseband signals and the Q-path baseband signals, which can then be provided to the baseband processor. HB receiver 302B includes similar components as of LB receiver 302A for processing signals in a higher frequency band.

In one embodiment, frequency synthesizer 300 includes a PLL block having a charge pump with a phase frequency detector, a loop filter, a programmable divider, a voltage-controlled oscillator. The frequency synthesizer 300 further includes a frequency doubler and an injection locking oscillator as described above with respect to FIG. 3.

In addition, frequency synthesizer 300 includes in-phase transmitting (TXI) phase rotator 314A, quadrature transmitting (TXQ) phase rotator 314B, in-phase receiving (RXI) phase rotator 314C, and quadrature receiving (RXQ) phase rotator 314D, which are specifically configured to perform phase rotation to generate in-phase LO signals and quadrature LO signals for LB transmitter 301A and LB receiver 302A. Specifically, TXI phase rotator 314A is coupled to the I-path up-convert mixer of LB transmitter 301A and TXQ phase rotator 314B is coupled to the Q-path up-convert mixer of LB transmitter 301A to enable the I-path and Q-path baseband signals to be mixed and modulated within the corresponding frequency band. RXI phase rotator 314C is coupled to the I-path down-convert mixer of LB receiver 302A and RXQ phase rotator 314D is coupled to the Q-path down-convert mixer of LB receiver 302A to enable the I-path and Q-path baseband signals to be mixed and demodulated within the corresponding frequency band.

In one embodiment, frequency synthesizer 300 includes in-phase transmitting (TXI) phase rotator 318A, quadrature transmitting (TXQ) phase rotator 318B, in-phase receiving (RXI) phase rotator 318C, and quadrature receiving (RXQ) phase rotator 318D, which are specifically configured to perform phase rotation to generate in-phase LO signals and quadrature LO signals for HB transmitter 301B and HB receiver 302B. Specifically, TXI phase rotator 318A is coupled to the I-path up-convert mixer of HB transmitter 301B and TXQ phase rotator 318B is coupled to the Q-path up-convert mixer of HB transmitter 301B to enable the I-path and Q-path baseband signals to be mixed and modulated within the corresponding frequency band. RXI phase rotator 318C is coupled to the I-path down-convert mixer of HB receiver 302A and RXQ phase rotator 318D is coupled to the Q-path down-convert mixer of HB receiver 302B to enable the I-path and Q-path baseband signals to be mixed and demodulated within the corresponding frequency band.

Again, in this example as shown in FIG. 4, there are two frequency bands covered by the frequency synthesizer 300. However, more frequency bands may be implemented within the integrated RF frontend. If there are more frequency bands to be implemented, more sets of TXI, TXQ, RXI, and RXQ phase rotators may be required.

Figure 5A:
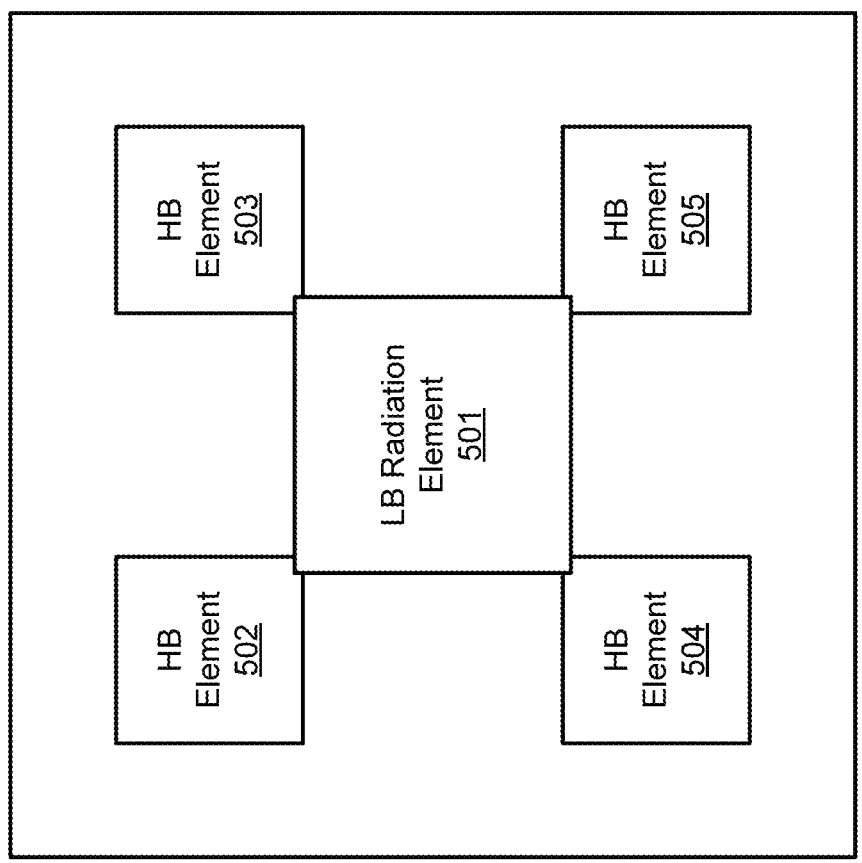
FIGS. 5A and 5B are block diagrams illustrating examples of antennas according to certain embodiments of the invention.

FIG. 5A a block diagram illustrating an example of an antenna according to one embodiment. Antenna 500 may represent any one or more of the antennas as described above, such as, for example, antennas 221-223 of FIG. 2 and antennas 310A-310B of FIG. 3. Referring to FIG. 5, antenna 500 may be implemented as an integrated circuit such as a single die of the IC. In one embodiment, antenna 500 includes multiple HB radiation elements and an LB radiation element. Each HB radiation element is configured to resonate or excite within a first frequency band to transmit and/or receive RF signals associated with the first frequency band. The LB band radiation element is configured to resonate or excite within a second frequency band to transmit and/or receive RF signals associated with the second frequency band. The HB radiation elements are arranged such that the distance between any two of the HB radiation elements is at least a half of a wavelength associated with the first frequency band. The LB radiation element is surrounded by the HB radiation elements, for example, in a symmetrical manner.

In this example as shown in FIG. 5A, antenna 500 includes an LB radiation element 501 surrounded by HB radiation elements 502-505. Although there are four HB radiation elements 502-505 shown, more or fewer HB radiation elements can also be implemented. Each of the HB radiation elements 502-505 is configured to resonate or excite within a first frequency band to transmit and/or receive RF signals associated with the first frequency band. The LB radiation element 501 is configured to resonate or excite within a second frequency band to transmit and/or receive RF signals associated with the second frequency band.

Note that FIG. 5A shows a top view of an antenna integrated circuit. LB radiation element 501 is not directly electrically coupled to any of HB radiation elements 502-505. They may be implemented in different substrate layers of the integrated circuit. According to one embodiment, each HB radiation element includes a coupling feed magneto electric dipole structure. Each LB radiation element includes a direct feed magneto electric dipole structure.

The HB radiation elements 502-505 are arranged such that the distance between any two of the HB radiation elements 502-505 is at least a half of a wavelength associated with the first frequency band. The LB radiation element is surrounded by the HB radiation element, for example, in a symmetrical manner as shown in FIG. 5A. In one embodiment, the distance between any two nearest or adjacent HB radiation elements (e.g., between HB radiation elements 502-503, between HB radiation elements 502 and 504, between HB radiation elements 504-505, or between HB radiation elements 503 and 505) is at least a half of a first wavelength associated with the first frequency band.

In one embodiment, the first frequency band is ranging approximately from 59 GHz to 71 GHz, while the second frequency band is ranging approximately from 24 GHz to 43 GHz. A wavelength ($\lambda$) of a frequency band is determined based on a center frequency (f) of the frequency band in view of the speed of light (C): $\lambda=C/f$. For the first frequency band from 59 GHz to 71 GHz, the center frequency is approximately 65 GHz and the corresponding first wavelength is approximately 2.3 mm. For the second frequency band from 24 GHz to 43 GHz, the center frequency is approximately 33.5 GHz and its corresponding second wavelength is approximately 4.5 mm.

In one embodiment, the distance between any two nearest or adjacent HB radiation elements is ranging approximately from 2.07 mm to 2.50 mm, preferably 2.3 mm. In this example, LB radiation element 501 is symmetrically surrounded by HB radiation elements 502-505. In one embodiment, each of the HB radiation elements 502-505 and the LB radiation element 501 is in a substantially rectangular or square shape, where a square shape represents a special case of a rectangular shape.

Figure 5B:
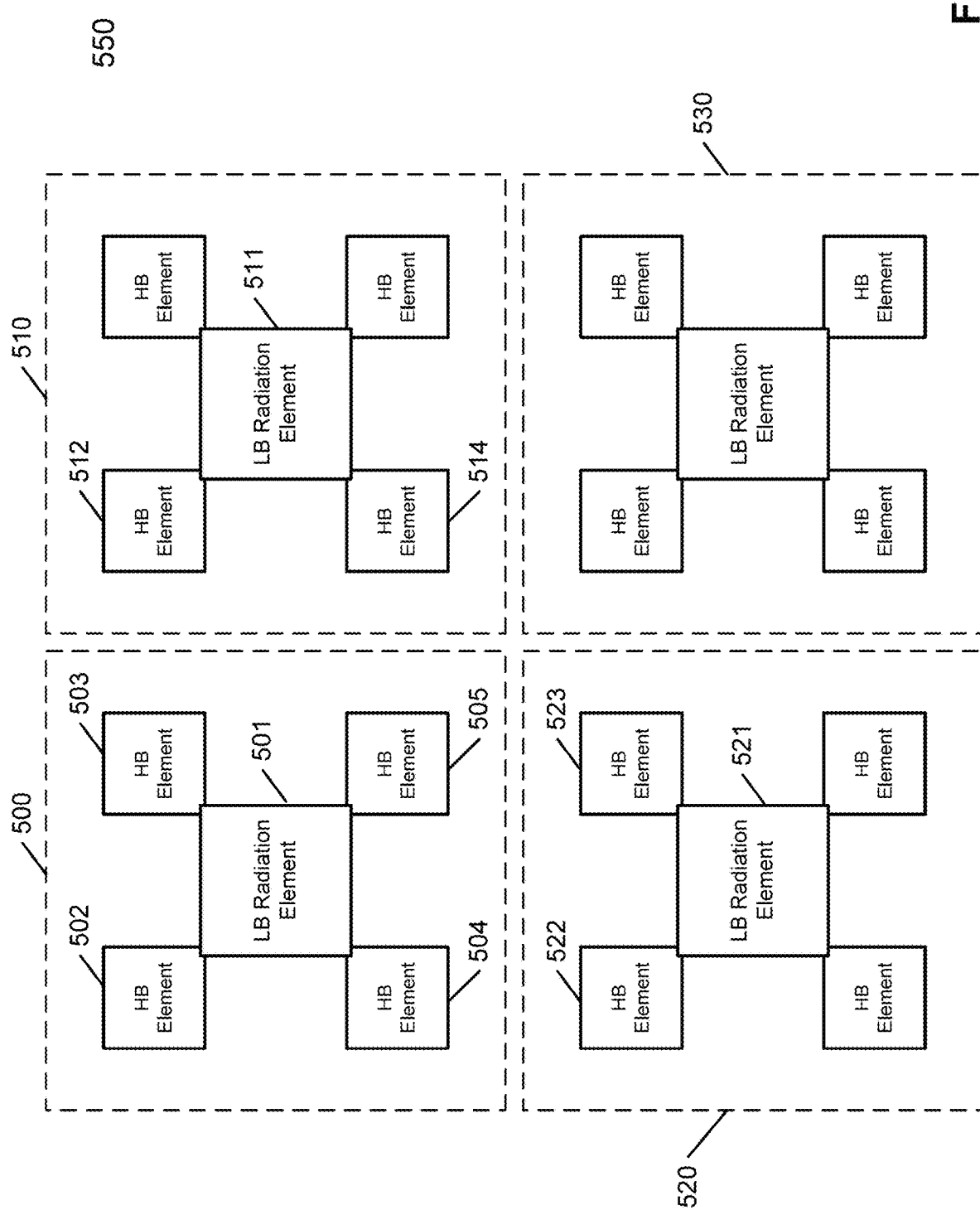

According to one embodiment, antenna 500 can be utilized one of a number of antenna units of an antenna array as shown in FIG. 5B. Referring to FIG. 5B, antenna array 550 includes a number of antenna units, in this example, antenna units 500, 510, 520, and 530. Each of antenna units 500, 510, 520, and 530 includes multiple HB radiation elements (e.g., HB radiation elements 502-505) and an LB radiation element (e.g., LB radiation element 501). The HB radiation elements of antenna array 550 are arranged such that the distance between any two of the HB radiation elements of antenna array 550 is at least a half of the first wavelength associated with the first frequency band (e.g., 2.3 mm). In one embodiment, a distance between any two nearest or adjacent HB radiation elements of antenna array 550 is approximately ranging from 2.07 mm to 2.5 mm. According to another embodiment, the distance between any two of the LB radiation elements is at least a half of the second wavelength associated with the second frequency band (e.g., 4.5 mm). In one embodiment, a distance between any two nearest or adjacent LB radiation elements of antenna array 550 is approximately ranging from 4.05 mm to 4.95 mm.

In this example as shown in FIG. 5B, the distance between HB radiation element 503 and HB radiation element 512 is ranging approximately from 2.07 mm to 2.5 mm, preferably 2.3 mm. The distance between LB radiation element 501 of antenna unit 500 and LB radiation element 511 of antenna unit 510 is ranging approximately from 4.05 mm to 4.95 mm, preferably 4.5 mm. The term of a distance between two radiation elements refers to a distance between center points of the radiation elements.

Figure 6:
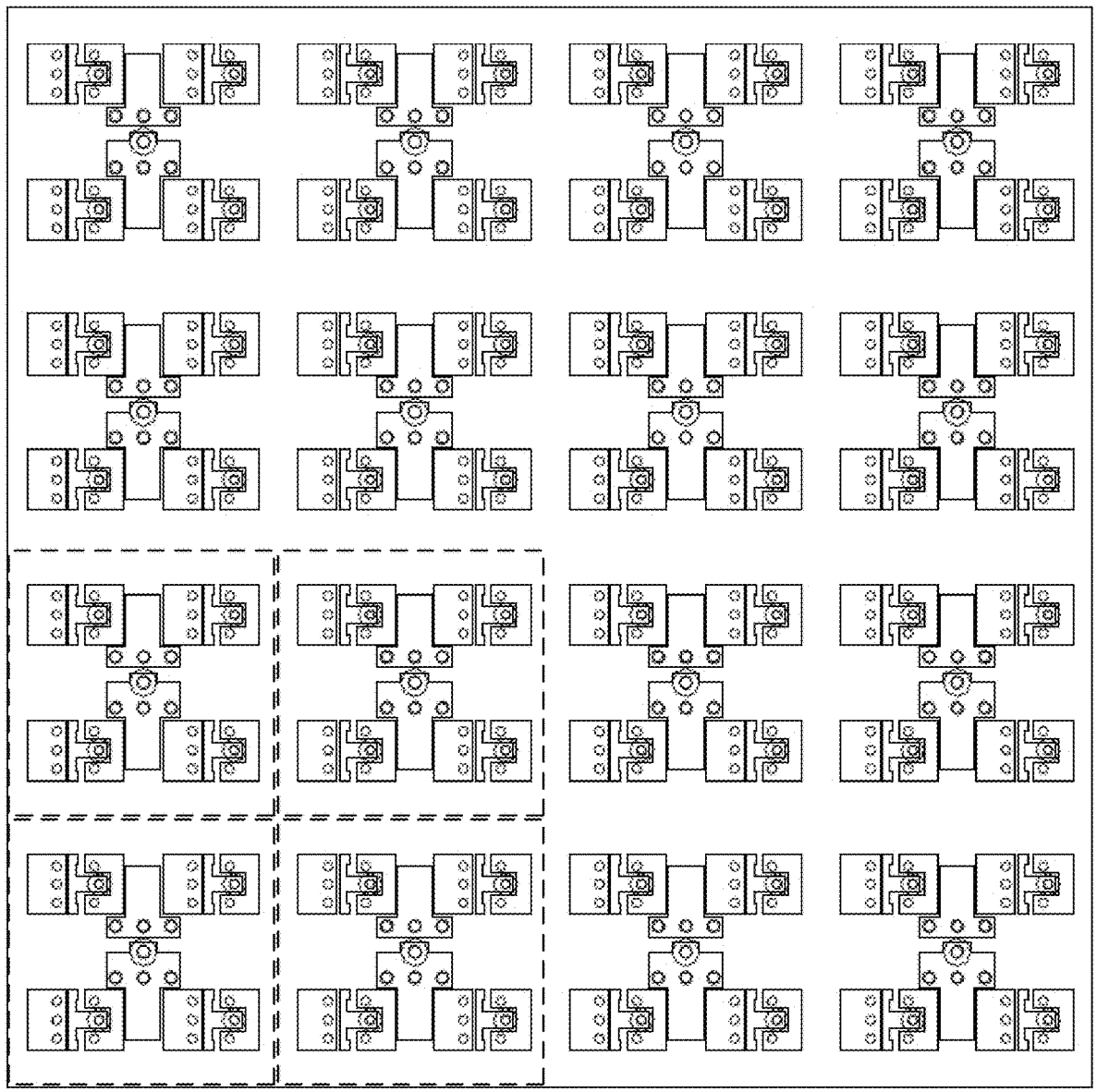
FIG. 6 is a block diagram illustrating an example of an antenna array according to one embodiment.

Although there are four antenna units as shown in FIG. 5B, the number of antenna units can be scaled up horizontally and/or vertically dependent upon the configuration, as shown in FIG. 6. When the number of antenna units increases, the distance between any two of the HB radiation elements and the distance between any two of the LB radiation elements of any antenna unit or antenna units have to satisfy the distance requirements as set forth above.

In one embodiment, in order to maintain the proper distance between two radiation elements of adjacent antenna units, the distance between each radiation element (e.g., either an HB radiation element or an LB radiation element) and an edge of the corresponding antenna unit (represented as a dash rectangular or square herein) is approximately a quarter (¼) of a wavelength of a corresponding frequency band. For example, the distance between an HB radiation element and an edge of the corresponding antenna unit is ranging approximately from 1.035 mm to 1.25 mm, preferably 1.15 mm. The distance between an LB radiation element and an edge of the corresponding antenna unit is ranging approximately from 2.025 mm to 2.475 mm, preferably 2.25 mm.

Figure 7:
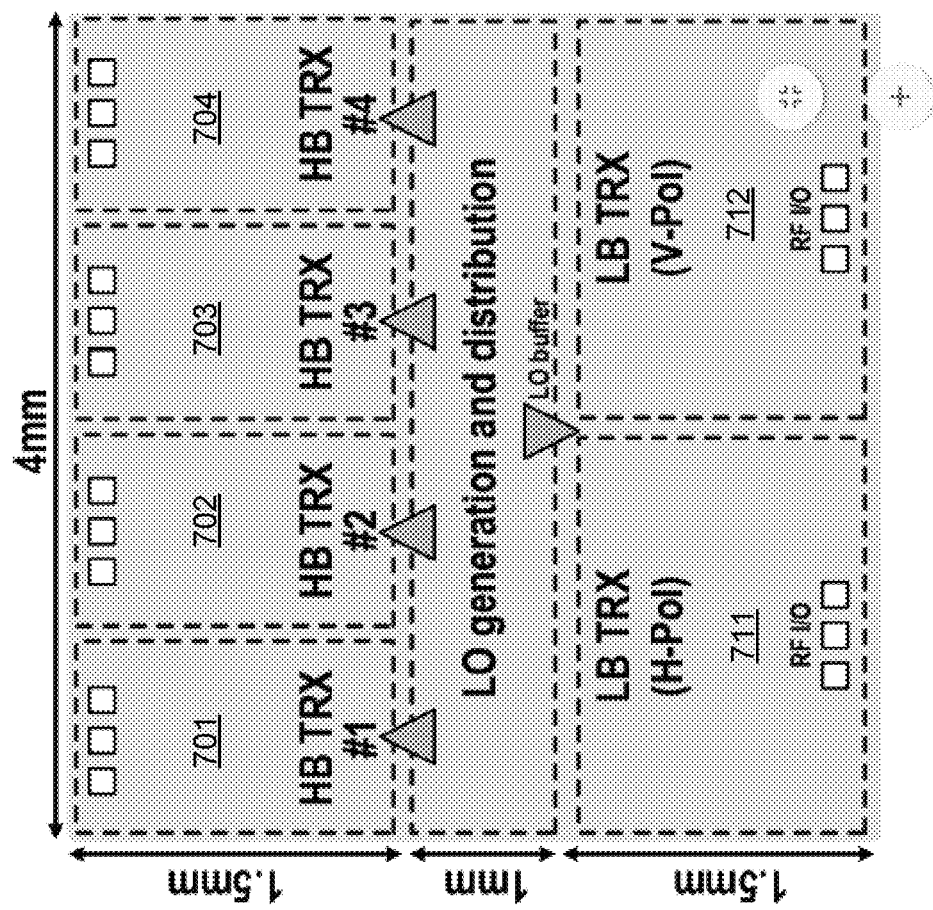
FIG. 7 is a block diagram illustrating a layout configuration of an RF frontend integrated circuit according to one embodiment.

FIG. 7 is a block diagram illustrating an example of an RF frontend integrated circuit according to one embodiment. Referring to FIG. 7, RF frontend IC 700 can represent any of the RF frontend ICs as described above, such as those as shown in FIGS. 3-4. RF frontend IC 700 includes at least four HB transceivers 701-704 and two LB transceivers 711-712. HB transceivers 701-704 can be respectively coupled to four HB radiation elements such as HB radiation elements 502-505 of antenna 500 of FIG. 5A. LB transceivers 711-712 can be coupled to LB radiation element 501 of antenna 500 of FIG. 5A. RF frontend IC 700 further includes an LO generation and distribution logic 710, which may represent at least a portion of frequency synthesizer 300 of FIG. 3.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A radio frequency (RF) antenna, comprising:
a plurality of high-band (HB) radiation elements, wherein each HB radiation element is configured to resonate within a first frequency band to transmit and receive RF signals associated with the first frequency band, wherein a distance between each of the HB radiation element and any remaining one of the HB radiation elements is at least a half of a wavelength associated with the first frequency band, wherein the plurality of HB radiation elements are coupled to at least four HB transceivers; and
a low-band (LB) radiation element configured to resonate within a second frequency band to transmit and receive RF signals associated with the second frequency band, wherein the LB radiation element is surrounded by the plurality of HB radiation elements, wherein the LB radiation element is coupled to two LB transceivers, the at least four HB transceivers and the two LB transceivers being included in an RF frontend integrated circuit (IC), the RF frontend IC further including a local oscillator (LO) generation and a distribution logic representing at least a portion of a frequency synthesizer.

2. The RF antenna of claim 1, wherein the first frequency band is ranging from 59 Gigahertz (GHz) to 71 GHz, and wherein the second frequency band is ranging from 24 GHz to 43 GHz.

3. The RF antenna of claim 1, wherein the distance between each of the HB radiation element and any remaining one of the HB radiation elements is approximately 2.3 millimeters (mm).

4. The RF antenna of claim 1, wherein the distance between any two nearest HB radiation elements is ranging at least from 2.07 mm to 2.50 mm.

5. The RF antenna of claim 1, wherein the plurality of HB radiation elements comprise at least four radiation elements symmetrically surrounding the LB radiation element.

6. The RF antenna of claim 1, wherein each of the HB radiation elements is in a substantially rectangular or square shape.

7. The RF antenna of claim 1, wherein the LB radiation element is in a substantially rectangular or square shape.

8. The RF antenna of claim 1, wherein the RF antenna is a first antenna unit of a plurality of antenna units forming an antenna array, each of the antenna units having a substantially identical structure.

9. The RF antenna of claim 8, wherein the antenna array includes a second antenna unit adjacent to the first antenna unit, wherein a distance between the LB radiation element of the first antenna unit and a second LB radiation element of the second antenna unit is at least a half of a second wavelength associated with the second frequency band.

10. The RF antenna of claim 9, wherein the distance between the LB radiation element of the first antenna unit and the second LB radiation element of the second antenna unit is approximately 4.5 mm.

11. The RF antenna of claim 9, wherein the distance between the LB radiation element of the first antenna unit and a nearest second LB radiation element of the second antenna unit is ranging from 4.05 mm to 4.95 mm.

12. A radio frequency (RF) antenna array, comprising:
a plurality of antenna units, wherein each of the antenna units comprises:
a plurality of high-band (HB) radiation elements, wherein each HB radiation element is configured to resonate within a first frequency band to transmit and receive RF signals associated with the first frequency band, wherein a distance between each of the HB radiation element and any remaining one of the HB radiation elements is at least a half of a wavelength associated with the first frequency band, wherein the plurality of HB radiation elements are coupled to at least four HB transceivers, and
a low-band (LB) radiation element configured to resonate within a second frequency band to transmit and receive RF signals associated with the second frequency band, wherein the LB radiation element is surrounded by the plurality of HB radiation elements, wherein the LB radiation element is coupled to two LB transceivers, the at least four HB transceivers and the two LB transceivers being included in an RF frontend integrated circuit (IC), the RF frontend IC further including a local oscillator (LO) generation and a distribution logic representing at least a portion of a frequency synthesizer.

13. The RF antenna array of claim 12, wherein the first frequency band is ranging from 59 Gigahertz (GHz) to 71 GHz, and wherein the second frequency band is ranging from 24 GHz to 43 GHz.

14. The RF antenna array of claim 12, wherein the distance between each of the HB radiation element and any remaining one of the HB radiation elements is approximately 2.3 millimeters (mm).

15. The RF antenna array of claim 12, wherein the distance between any two nearest HB radiation elements is ranging at least from 2.07 mm to 2.50 mm.

16. The RF antenna array of claim 12, wherein the plurality of HB radiation elements comprise at least four radiation elements symmetrically surrounding the LB radiation element.

17. The RF antenna array of claim 12, wherein each of the HB radiation elements is in a substantially rectangular or square shape, and wherein the LB radiation element is in a substantially rectangular or square shape.

18. The RF antenna array of claim 12, wherein a distance between an LB radiation element of any antenna unit and an LB radiation element of another antenna unit is at least a half of a second wavelength associated with the second frequency band.

19. The RF antenna array of claim 18, wherein a distance between an LB radiation element of any antenna unit and an LB radiation element of another antenna unit is approximately 4.5 mm.

20. The RF antenna array of claim 18, wherein a distance between any two nearest LB radiation elements is ranging from 4.05 mm to 4.95 mm.

* * * * *